Dec. 12, 1961 R. H. DU HAMEL ET AL 3,013,226

WIDEBAND TAPERED BALUN

Filed Sept. 14, 1959 3 Sheets-Sheet 1

INVENTORS
RAYMOND H. DUHAMEL
VITO P. MINERVA
BY
ATTORNEY

WIDEBAND TAPERED BALUN

Filed Sept. 14, 1959 3 Sheets-Sheet 2

INVENTORS
RAYMOND H. DUHAMEL
VITO P. MINERVA
BY
Mario Moody
ATTORNEY

Dec. 12, 1961 R. H. DU HAMEL ET AL 3,013,226

WIDEBAND TAPERED BALUN

Filed Sept. 14, 1959 3 Sheets-Sheet 3

INVENTORS
RAYMOND H. DUHAMEL
VITO P. MINERVA
BY [signature]
ATTORNEY

United States Patent Office 3,013,226
Patented Dec. 12, 1961

3,013,226

WIDEBAND TAPERED BALUN

Raymond H. Du Hamel and Vito P. Minerva, Cedar Rapids, Iowa, assignors to Collins Radio Company, Cedar Rapids, Iowa, a corporation of Iowa Filed Sept. 14, 1959, Ser. No. 839,919
2 Claims. (Cl. 333—26)

The present invention relates in general to an impedance transformer for transmission of electrical energy and in particular to a balun for converting from any unbalanced impedance to a balanced impedance over an extremely wide frequency range.

It is desirable to convert from an unbalanced to balanced line and in the process to accomplish an impedance change.

It is an object of this invention to provide an impedance conversion from unbalanced to balanced line with a minimum mismatch.

An article entitled "A Transmission Line Taper of Improved Design" by R. W. Klopfenstein in the January 1956 issue of the Proceedings of the I.R.E., pages 31–35, shows that for a tapered coaxial line matching section there is an optimum shape of the taper for a particular impedance transformation and a particular length in which the transfer can be made.

The present invention utilizes the curves shown in this article, but it has been discovered by the present inventors that a coaxial line may be converted from a coaxial line to a two-line balanced system by slitting the outer conductor of the coax and gradually decreasing the material in the outer conductor until it becomes a second conductor parallel to the center conductor.

It is an object of the present invention, therefore, to provide a conversion from a balanced to an unbalanced load in a manner so as to minimize reflections over a broad frequency range.

Another object is to provide an impedance transformer useable over a broad bandwidth of frequencies.

Further objects, features, and advantages of the invention will become apparent from the following description and claims when read in view of the drawings, in which:

FIGURE 1 is a side view of an impedance transformer according to this invention;

FIGURES 2*a–g* comprise sectional views taken on section lines 2*a* through 2*g* respectively in FIGURE 1;

Figure 1:
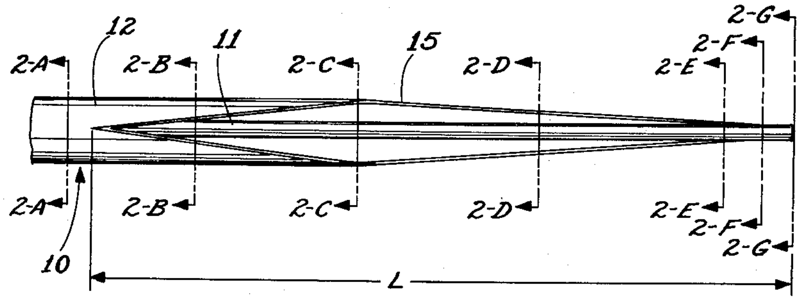
Figure 2:
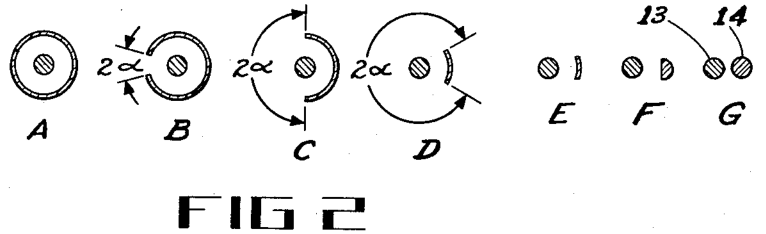

FIGURE 1 illustrates a coaxial line 10 which has an inner conductor 11 and an outer conductor 12. The outer conductor is slitted starting at a point to the left in FIGURE 1 and gradually material is removed from the outer conductor until two parallel lines 13 and 14 are produced at the right edge of FIGURE 1. The intermediate portion 15 of the outer conductor is removed so as to produce minimum mismatch for a particular bandwidth of frequencies.

The balun illustrated in FIGURE 1 is an impedance matching transition from coaxial line to a balanced two conductor, open line. The transition is accomplished by cutting open the outer wall of the coax so that a cross section view shows a sector of the outer conductor removed.

Figures 3, 7:
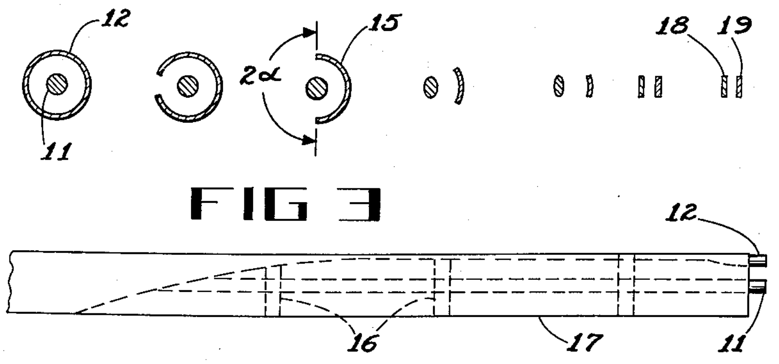
FIGURE 3 shows a modification wherein the lines are converted to strip lines rather than circular lines.
FIGURE 7 illustrates an encapsulated balun according to this invention.

The angle subtended by the open sector is denoted by $2\alpha$. As one progresses along the balun from the coaxial end, the angle $2\alpha$ varies from zero to almost $2\pi$ yielding the transition from coax to an open, two conductor line. The cross section of the conductors is then varied as required. A transition from coaxial cable to a balanced strip line may also be made. This is illustrated in FIGURE 3.

The broadband impedance matching properties of the balun are obtained by utilizing a continuous transmission line taper as described in the Klopfenstein article. The characteristic impedance of the balun transformer is tapered along its length so that the input reflection coefficient follows a Tchebycheff response in the pass band. The length of the balun is determined by the lowest operating frequency and the maximum reflection coefficient which is to occur in the pass band. The balun has no upper frequency limit other than the frequency where higher order coaxial modes are supported or where radiation from the open wire line becomes appreciable.

Before discussing the "balun" property of the device, a brief review of balance conditions on an open transmission line is in order. A balanced, two conductor transmission line has equal currents of opposite phase in the line conductors at any cross section. System unbalance is evidenced by the addition of codirectional currents of arbitrary phase to the balanced transmission line currents. The order of unbalance is measured by the ratio of the codirectional current to the balanced current. In a coaxial line, the total current on the inside surface of the outer conductor is equal and opposite to the total current on the center conductor. The ideal balun functions by isolating the outside surface of the coax from the transmission line junction so that all of the current on the inside surface of the coax outer conductor is delivered in the proper phase to one of the two, balanced conductors. Unbalance of the transmission line currents results if current returns to the generator on the outside surface of the coaxial line.

Consider the Tchebycheff tapered balun transformer of this invention which is formed by increasing the slot in the outer wall of the coax until an open, two conductor line is obtained. Over the length of the transition the electromagnetic field changes from a totally confined field in the coax to the "open" field of a two wire transmission line. It is evident that the total current on the outside surface of the coax at the balun input must result from the summation of wave reflections which originate over the entire length of the open transition. But the slot transition is purposely tapered such that the net reflection at the balun input is arbitrarily small. Consequently, negligible current appears on the outside of the coaxial line at the balun input and electrical balance at the output terminals is very good. In other words, the physical geometry of the transition which produces negligible wave reflections and leads to a broadband impedance transformer also results in the operation of the device as a balun.

Figure 4:
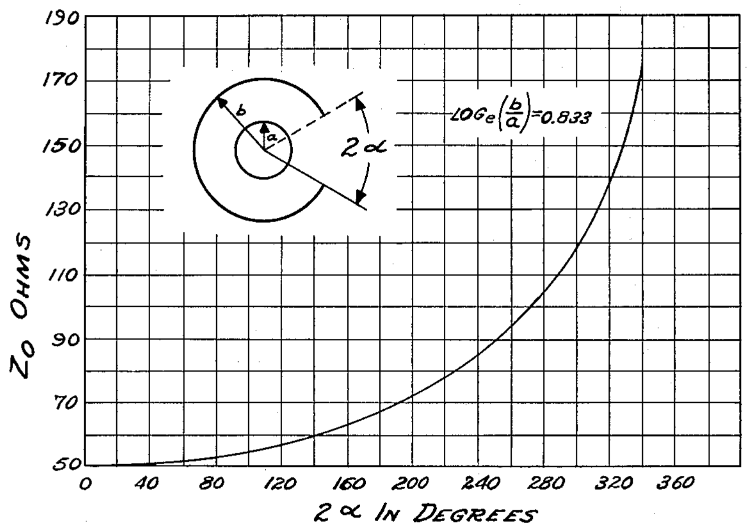
FIGURE 4 illustrates the impedance in an open coaxial line as a function of the angle $2\alpha$ subtended by the removed portion of the outer conductor.

Assuming that the characteristic impedance of the balun at any cross section is equal to the characteristic impedance of a uniform, slotted coaxial line of that particular cross section, it is possible to synthesize the required impedance taper by providing the appropriate cross section at each position along the balun transformer. In order to carry out this procedure, one must know the characteristic impedance of a uniform, slotted coaxial line as the angle $2\alpha$ varies from zero to $2\pi$. This information was obtained by both theoretical analysis and experimental measurements. The characteristic impedance of the slotted line was determined from a variational solution of the two dimensional boundary value problem. The variational expressions yield upper and lower bounds to the exact characteristic impedance. The upper bound is obtained from a variational expression involving the charge distribution on the outer conductor of the slotted coaxial line, while the lower bound is obtained from a variational expression involving the potential distribution in the slotted region. Characteristic impedance was determined experimentally by painting the slotted line cross section on resistance card using silver paint and measuring the D.C. resistance of the cross section in this two dimensional analogue of an electrolytic tank. FIGURE 4 illustrates the characteristic impedance of a coaxial configuration wherein $$\log_e\left(\frac{b}{a}\right)=0.833(Z_0-50\text{ ohms})$$

where $b$ is the inside radius of the outer conductor and $a$ is the outside radius of the inner conductor as a function of the angular opening, $2\alpha$. A curve such as this one may be used to design a balun for matching a large range of impedances with an arbitrarily small standing wave ratio.

Having established the characteristic impedance of the uniform, slotted coaxial line, a specific balun design was undertaken. A transition from 50 ohm coaxial line to 150 ohm two conductor line was selected for the balun. As mentioned previously, the characteristic impedance of the balun transformer is tapered along its length so that the input reflection coefficient follows a Tchebycheff response in the pass band according to FIGURE 5. This curve is illustrated in the previously referenced article. The maximum allowable reflection coefficient in the pass band was chosen as 0.055. This corresponds to a maximum standing wave ratio of 1.11 to 1. It follows that the length of the balun $l=0.478\lambda$, where $\lambda$ is the largest operating wavelength. The lowest frequency was selected as 50 megacycles which fixed the length $l$ as approximately 2.86 meters.

Figure 5:
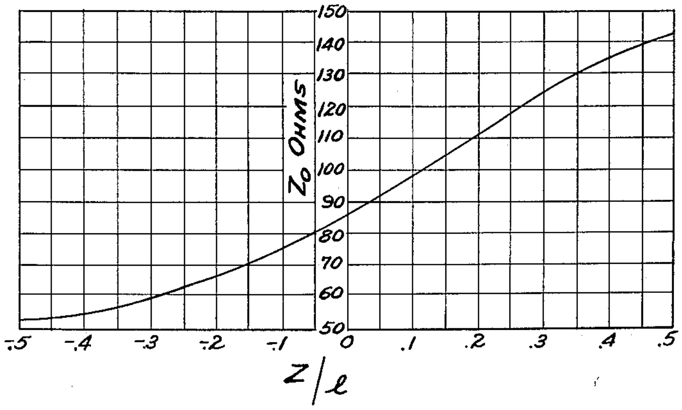
FIGURE 5 illustrates the desired impedance taper as a function of length for minimum reflection.

Let the total length $l$ of the balun be defined from $Z=-l/2$ to $Z=+l/2$. FIGURE 5 shows the impedance contour required for Tchebycheff response under the prescribed design criteria. The angle $2\alpha$ which yields the proper impedance at each position along the balun may be extracted from FIGURE 4. The outer conductor of the coaxial line had an inside diameter of 1.527 inches. The balun was fabricated by milling through the coax outer conductor to the depth which yielded the angle $2\alpha$. The milling cut was performed in discrete 6-inch increments along the balun until the outer conductor was reduced to a thin concave strip having a width equal to the center conductor diameter. This occurred at the position $Z/l=0.373$ where $2\alpha=312°$ and $Z_0=131$ ohms. The strip outer conductor was transformed to a circular cylinder identical to the center conductor over a 6-inch length from $Z/l=0.373$ to $Z/l=0.426$. The spacing between cylindrical conductors at $Z/l=0.426$ was such that the impedance was the required 136 ohms as shown in FIGURE 5. From $Z/l=0.426$ to $Z/l=0.5$ the spacing of the cylindrical conductors was gradually increased so that the impedance followed the contour of FIGURE 5.

Since the balun may be viewed as a two port waveguide junction, it was convenient to measure its performance by means of Deschamps' method described in "Determination of Reflection Coefficients and Insertion Loss of a Waveguide Junction," J. Appl. Phys., vol. 24, pp. 1046–1050; August 1953. The two conductor output of the balun was termined in a large, reflecting metal sheet mounted perpendicular to the line. The dissipative loss and scattering matrix coefficients of the balun are readily obtained by locating the reflecting sheet at four equally spaced positions and measuring the corresponding reflection coefficient at the coaxial input. Since the scattering coefficient $S_{11}$ corresponds to the input reflection coefficient for a reflectionless termination of the output line, one thereby obtains the input VSWR for a "matched" termination of the two conductor line. This procedure also avoids the considerable difficulties encountered in providing a perfect "matched" termination for an open wire line.

Figure 6:
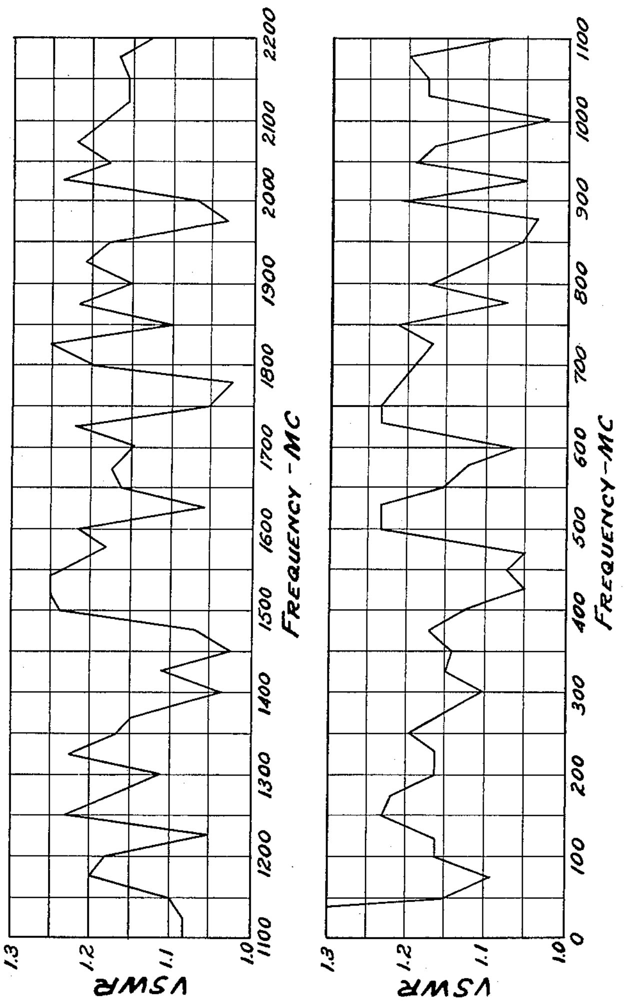
FIGURE 6 illustrates the experimental results obtained from a tapered balun transformer according to this invention.

The voltage standing wave ratio as a function of frequency for the described model is presented in the curves of FIGURE 6. It may be seen that the VSWR never exceeded 1.25:1 over the spectrum 43 to 2200 mc. which represents a 50:1 bandwidth. The rapid increase in VSWR below the cutoff frequency 50 mc. is also evident in FIGURE 6. The balun dissipative loss was not measurable below 500 mc. At 1,000 mc. the loss was approximately 0.1 db and increased to 0.3 db at 2,000 mc. The spacing between the cylindrical conductors was $0.21\lambda$ at 2,000 mc.

FIGURE 7 shows a balun according to this invention wherein spacers 16 are inserted between the outer conductor 15 and the inner conductor 11. Then the structure is encapsulated with a suitable plastic material 17 so as to weatherproof the apparatus.

The performance of the Tchebycheff tapered balun transformer is unique, it provides near perfect impedance matching over frequency bandwidths as great as 100:1. The balun geometry is not limited to a transition from coax to two wire transmission line; other output configurations such as a balanced strip line are also possible. This is illustrated in FIGURE 3 wherein the strip lines are numbered 18 and 19. The basic design allows one to match a large range of impedances with an arbitrarily small standing wave ratio. The physical length of the balun is determined by the lowest frequency of operation and the maximum reflection coefficient which is to occur in the pass band. It is evident from the very small dissipative loss that negligible radiation results from the balun. Of course, radiation may become appreciable at extreme frequencies but it appears that an upper limit of 5 to 10 kmc. may not be impractical for the Tchebycheff tapered balun. A fact of considerable importance is that the balun is well suited to high power applications.

Although this invention has been described with respect to particular embodiments thereof, it is not to be so limited as changes and modifications may be made therein which are within the full intended scope of the invention as defined by the appended claims.

We claim.

1. A balun for the transmission of electrical energy comprising a coaxial waveguide with an outer and inner conductor, a slit formed in the outer conductor of said coaxial waveguide and the material of the outer conductor progressively removed as a function of distance from the start of the split until a pair of parallel lines are formed by the inner conductor and the remnant of the outer conductor, and wherein the transition section from the coaxial line to the pair of parallel lines is constructed so that the impedance transformation corresponds to a Tchebycheff distribution so as to produce a minimum mismatch in the transition from the coaxial line to the pair of parallel lines.

2. A balun for the transmission of electrical energy comprising a coaxial waveguide formed with an inner and outer conductor, a slit formed in the outer conductor and the material of the outer conductor progressively removed as a function of distance from the start of the slit until a pair of strip lines are formed comprising the inner conductor converted to a strip, and the remnant of the outer conductor of the coaxial line changed to a strip form.

References Cited in the file of this patent

UNITED STATES PATENTS 2,437,244 Dallenbach ------------ Mar. 9, 1948